United States Patent
Gu et al.

(10) Patent No.: US 9,323,408 B2
(45) Date of Patent: Apr. 26, 2016

(54) TOUCH POINT POSITIONING AND DETECTING CIRCUIT FOR A TOUCH PANEL, TOUCH PANEL AND DISPLAY DEVICE

(71) Applicants: HEFEI BOE OPTOELECTRONICS TECHNOLOGY CO., LTD., Hefei, Anhui (CN); BOE TECHNOLOGY GROUP CO., LTD., Beijing (CN)

(72) Inventors: Xiaofang Gu, Beijing (CN); Ming Hu, Beijing (CN)

(73) Assignees: HEFEI BOE OPTOELECTRONICS TECHNOLOGY CO., LTD., Hefei, Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/347,932

(22) PCT Filed: Apr. 8, 2013

(86) PCT No.: PCT/CN2013/073908
§ 371 (c)(1),
(2) Date: Mar. 27, 2014

(87) PCT Pub. No.: WO2014/131226
PCT Pub. Date: Sep. 4, 2014

(65) Prior Publication Data
US 2015/0029421 A1 Jan. 29, 2015

(30) Foreign Application Priority Data
Feb. 28, 2013 (CN) .......................... 2013 1 0064012

(51) Int. Cl.
*G01B 11/14* (2006.01)
*G06F 3/044* (2006.01)
(Continued)

(52) U.S. Cl.
CPC ............... *G06F 3/044* (2013.01); *G01B 11/14* (2013.01); *G06F 3/042* (2013.01); *G06F 3/0412* (2013.01)

(58) Field of Classification Search
None
See application file for complete search history.

(56) References Cited

U.S. PATENT DOCUMENTS

| | | | |
|---|---|---|---|
| 7,742,041 B2 * | 6/2010 | Lee et al. | 345/173 |
| 2006/0077186 A1 * | 4/2006 | Park et al. | 345/173 |

(Continued)

FOREIGN PATENT DOCUMENTS

| | | |
|---|---|---|
| CN | 1877401 A | 12/2006 |
| CN | 101140738 A | 3/2008 |

(Continued)

OTHER PUBLICATIONS

International Search Report mailed Nov. 21, 2013; PCT/CN2013/073908.

(Continued)

*Primary Examiner* — David D Davis
(74) *Attorney, Agent, or Firm* — Ladas & Parry LLP

(57) ABSTRACT

A touch point positioning and detecting circuit for a touch panel and a touch panel with a display device to achieve an optical type in-cell touch panel. The touch point positioning and detecting circuit comprises a touch sensing sub-circuit, a detecting sub-circuit which is connected with the touch sensing sub-circuit, a first touch driving electrode line and a second touch driving electrode line. The touch sensing sub-circuit comprises a capacitor, a first switch transistor and a second switch transistor. A gate and a source of the first switch transistor are connected with the first touch driving electrode line, and a drain of the first switch transistor is connected with a drain of the second switch transistor. A source of the second switch transistor is connected with the detecting sub-circuit, and a gate of the second switch transistor is connected with the second touch driving electrode line. One end of the capacitor is connected with the drain of the first switch transistor and the other end of the capacitor is connected with an electrode line providing a high level voltage.

17 Claims, 6 Drawing Sheets

(51) Int. Cl.
*G06F 3/041* (2006.01)
*G06F 3/042* (2006.01)

(56) References Cited

U.S. PATENT DOCUMENTS

| | | | |
|---|---|---|---|
| 2008/0252618 A1 | 10/2008 | Chung et al. | |
| 2009/0101900 A1 | 4/2009 | Chuang et al. | |
| 2009/0147191 A1* | 6/2009 | Nakajima et al. | 349/116 |
| 2011/0316812 A1* | 12/2011 | Engla Syam | 345/175 |

FOREIGN PATENT DOCUMENTS

| | | |
|---|---|---|
| CN | 101154139 A | 4/2008 |
| CN | 101266346 A | 9/2008 |
| CN | 101414068 A | 4/2009 |
| CN | 101726890 A | 6/2010 |
| CN | 101887200 A | 11/2010 |
| CN | 101900899 A | 12/2010 |
| CN | 102830857 A | 12/2012 |
| CN | 203133800 U | 8/2013 |
| GB | 2427062 A | 12/2006 |
| WO | 03/071345 A1 | 8/2003 |

OTHER PUBLICATIONS

First Chinese Office Action dated May 18, 2015; Appln. No. 201310064012.6.
Second Chinese Office Action Appln. No. 201310064012.6; Dated Jul. 24, 2015.
International Preliminary Report on Patentability Appln. No. PCT/CN2013/073908; Dated Sep. 1, 2015.

* cited by examiner

TOUCH POINT POSITIONING AND DETECTING CIRCUIT FOR A TOUCH PANEL, TOUCH PANEL AND DISPLAY DEVICE

TECHNICAL FIELD

The embodiments of the present invention disclose a touch point positioning and detecting circuit for a touch panel, a touch panel and a display device.

BACKGROUND

A touch panel (TP), as an input media, generally comprises a resistive touch panel, a capacitive touch panel, an optical sensing touch panel and etc. according to principles. According to its constituting structures, the touch panel generally comprises an out-cell touch panel in which the touch panel is added on a display panel, an on-cell touch panel in which a touch sensing unit is located on a display panel, and an in-cell touch panel in which a touch sensing unit is embedded in a panel.

The touch panel and the display panel are integrated as one to serve as an in-cell touch panel, and the in-cell touch panel plays an important role in the field of display. A mutual capacitance touch panel is popular with people due to the advantages of high sensitivity and multi-point touch.

Light and thin touch panels with a simple structure have always been pursued by producers. The in-cell touch panel can meet the light, thin and simple-structure demands. The capacitive in-cell touch panel has undergone rapid development and is very popular, but the capacitive touch panel is mainly used in medium and small-sized display devices, for example, 10-inch products or products below 10 inches, for a large-sized display device, the capacitive touch panel cannot meet practical demands.

SUMMARY

Embodiments of the present invention provide a touch point positioning and detecting circuit for a touch panel, a touch panel and display device, to achieve an optical in-cell touch panel so that it is not limited in panel size and has a stable service life.

The touch point positioning and detecting circuit for a touch panel provided by the embodiments of the present invention comprises a touch sensing sub-circuit, a detecting sub-circuit connected with the touch sensing sub-circuit and used to determine the position of a touch point according to a touch signal outputted by the touch sensing sub-circuit, a first touch driving electrode line and a second touch driving electrode line.

The touch sensing sub-circuit comprises a capacitor, a first switch transistor and a second switch transistor. A gate and a source of the first switch transistor are connected with the first touch driving electrode line. A drain of the first switch transistor is connected with a drain of the second switch transistor. A source of the second switch transistor is connected with the detecting sub-circuit. A gate of the second switch transistor is connected with the second touch driving electrode line. One end of the capacitor is connected with the drain of the first switch transistor and the other end of the capacitor is connected with an electrode line providing a high level voltage. The first switch transistor is an optical switch transistor.

For example, the electrode line providing the high level voltage is the first touch driving electrode line.

For example, the electrode line providing the high level voltage is a common electrode line.

For example, the first touch driving electrode line and the second touch driving electrode line are gate lines.

For example, the first switch transistor and the second switch transistor are N type transistors.

For example, the detecting sub-circuit comprises: an amplifier, a capacitor connected across the reverse input end and the output end of the amplifier, and a switch connected across the reverse input end and the output end of the amplifier, and the source of the second switch transistor is connected with the reverse input end of the amplifier.

The embodiments of the present invention further provide a touch panel comprising the above touch point positioning and detecting circuit.

For example, the touch point positioning and detecting circuit is located in a display area in the sub-pixel units in an array substrate.

The embodiments of the present invention further provide a display device comprising the above touch panel.

The embodiments of the present invention put forward a new optical type touch point positioning and detecting circuit for a touch panel comprising two switch transistors and one capacitor, wherein, the first switch transistor is an optical switch transistor, the second switch transistor controls the output of the touch signal, and the first switch transistor is sensitive to light intensity and achieves an optical sensing touch function. The optical sensing touch panel is not limited by the size of the display panel and has a stable service life.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
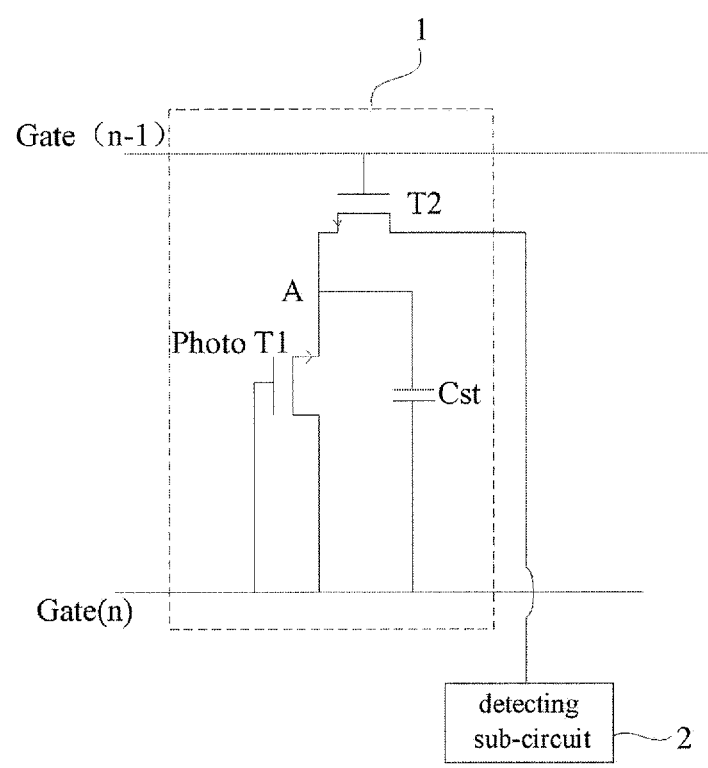
FIG. 1 is a schematic diagram of the structure of the touch point positioning and detecting circuit for a touch panel provided by an embodiment of the present invention.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, the technical terms or scientific terms used herein should be the general meanings understood by one having ordinary skills in the field of the present invention. The terms "first", "second" and similar terms used in the description and claims of this patent application do not represent any order, amount or importance, and just aim to differentiate different parts. Likewise, similar terms such as "one" or "a" do not represent limitation on amount while refer to at least one. Similar terms such as "including" or "comprising" refer to that an element or article preceding the terms "including" or "comprising" covers the elements, articles and equivalents thereof listed after the terms "including" or "comprising", and do not exclude other elements or articles. Similar terms such as "connect" or "couple" are not limited to physical or mechanical connections, and can comprise electrical connection, no matter direct or indirect. Terms such as "upper", "lower", "left" and "right" are only intended to represent relative position relationships, when the absolute position of a described object is changed, the relative position relationships may be changed correspondingly.

The embodiments of the present invention provide a touch point positioning and detecting circuit for a touch panel, a touch panel and a display device, to achieve an optical type in-cell touch panel.

The optical type touch panel will be briefed hereinafter.

Optical type touch panels are usually divided into an infrared type, an in-cell type, a projection type and etc. The optical type touch panel provided by the embodiments of the present invention is an in-cell touch panel under a natural light.

The in-cell touch panel under a natural light provided by the embodiments of the present invention determines the position of a touch point through sensing the change of light intensity of a touch point at the touch panel with a photosensitive element.

The present invention is made in view of the traditional capacitance type in-cell touch panel.

The embodiments of the present invention achieve an optical type in-cell touch panel which has a simple structure and is not limited by the size of the display panel through embedding in the display panel a touch sensing sub-circuit for sensing a touch point, a touch driving electrode line and a touch sensing electrode line for achieving a touch function.

The technical solutions provided by the embodiments of the present invention will be specifically described hereinafter with the drawings.

The touch point positioning and detecting circuit for a touch panel provided by the embodiments of the present invention can be embedded in a display panel in the filed of liquid crystal display, or in a display panel in the field of organic light emitting display. The touch driving electrode line in the touch panel can be a separately provided electrode line independent of the gate line, the data line, the common electrode line and etc, and can be one of the gate line, the data line, the common electrode line.

The present invention will be detailed hereinafter in the case that the touch driving electrode line is a gate line. That is, the touch point positioning and detecting circuit for a touch panel provided by the embodiments of the present invention is provided on the lower substrate (a substrate comprising pixels) of the display panel.

As shown in FIG. 1, the touch point positioning and detecting circuit for a touch panel (also referred to an optical type sensing touch circuit) provided by the embodiments of the present invention comprises:

a touch sensing sub-circuit 1, a detecting sub-circuit 2 which is connected with the touch sensing sub-circuit and is used to determine the position of a touch point according to a touch signal outputted by the touch sensing sub-circuit, and a first touch driving electrode line (the gate line Gate (n) shown in FIG. 1) and a second touch driving electrode line (the gate line Gate (n-1) shown in FIG. 1);

the touch sensing sub-circuit 1 comprises: a capacitor Cst, a first switch transistor T1 and a second switch transistor T2; the first switch transistor T1 is an optical switch transistor (Photo TFT) (that is, a photosensitive switch transistor);

the gate G and the source S of the first switch transistor T1 are connected with the gate line Gate(n), and the drain D of the first switch transistor is connected with the drain D of the second switch transistor T2;

the source S of the second switch transistor T2 is connected with the detecting sub-circuit 2, and the gate of the second switch transistor is connected with the gate line Gate(n-1); and one end of the capacitor Cst is connected with the drain D of the first switch transistor T1 and the other end of the capacitor Cst is connected with an electrode line providing a high level voltage.

For example, the other end of the capacitor Cst shown in FIG. 1 is connected with the gate line Gate(n).

Figure 2:
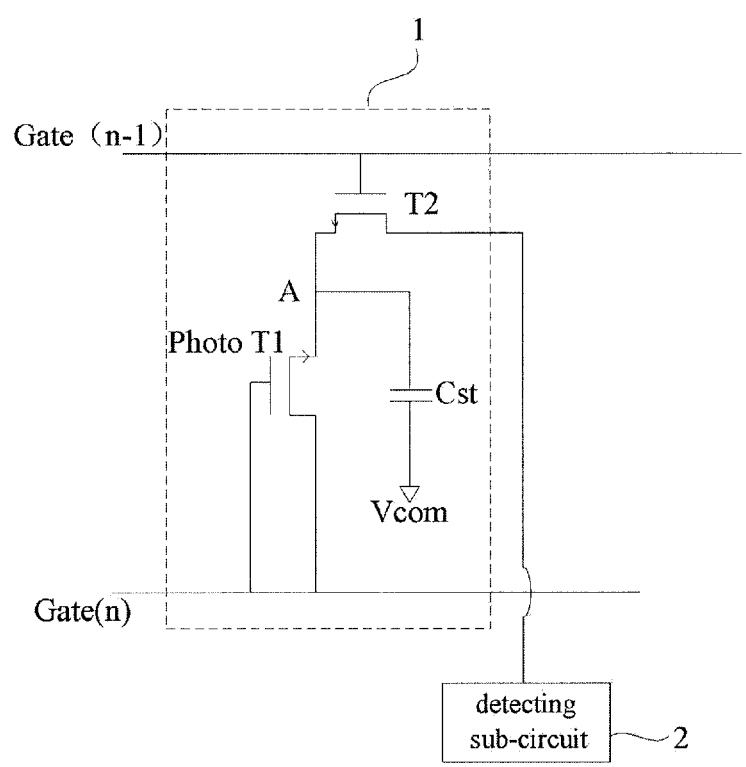
FIG. 2 is a schematic diagram of the structure of the touch point positioning and detecting circuit for a touch panel provided by another embodiment of the present invention.

As shown in FIG. 2, the other end of the capacitor Cst is connected with a common electrode line, that is, the electrode line corresponding to the Vcom in FIG. 2.

Or, for example, the other end of the capacitor Cst is directly connected with a high level voltage source.

The capacitor (Cst) shown in FIG. 1 is a storage capacitor, and serves the same function with the storage capacitor in a traditional pixel (Pixel).

FIG. 1 shows the structure of a new optical type sensing touch circuit. The sensing touch circuit can be provided in a liquid crystal display panel, for example, in the pixel units of an array substrate. An optical type touch sensing sub-circuit can be added in the pixel units.

For example, the first switch transistor T1, that is, a photo TFT, can be formed with a large-sized thin film transistor, and no black matrix BM shields the corresponding position of the color filter substrate CF. That is, the photo TFT is located in the display area of sub-pixel units.

The second switch transistor T2 is formed with a small-sized thin film transistor, and the gate of the thin film transistor is connected with the last row of gate scan lines, and the source of the thin film transistor is connected to the detecting sub-circuit 2 through a touch read signal line (Readout line), and gate scan coordinates are positioned through the second switch transistor T2.

Figure 3:
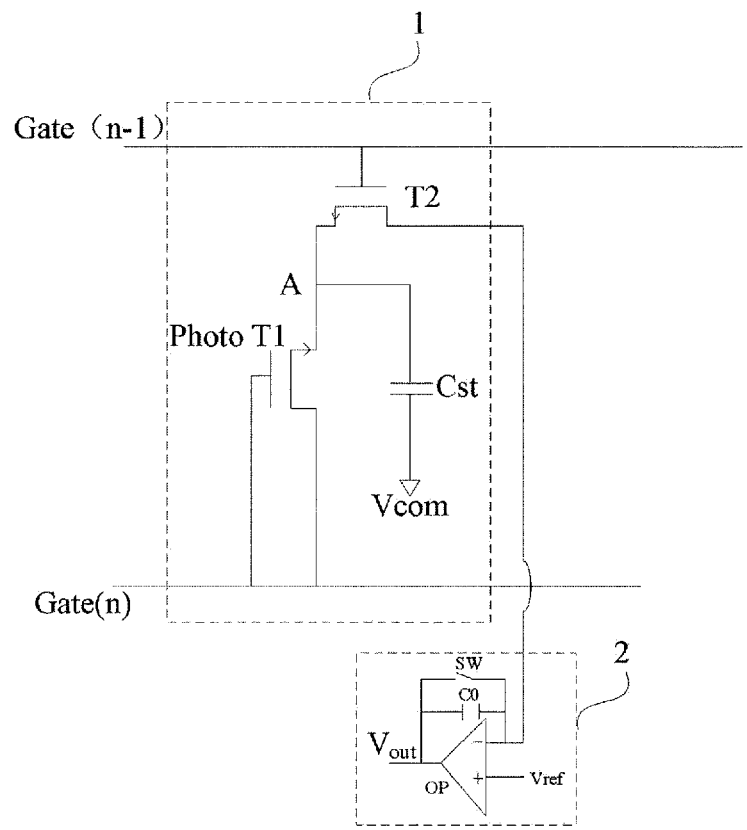
FIG. 3 is a schematic diagram of the structure of the touch point positioning and detecting circuit for a touch panel provided by another embodiment of the present invention.

Referring to FIG. 3, the detecting sub-circuit 2 shown in FIG. 1 or 2 comprises an amplifier OP, a capacitor C0 connected across the reverse input end and the output end of the OP, and a switch SW connected across the reverse input end and the output end of the OP.

The switch transistors provided by the embodiments of the present invention are an N type transistor, and the gates of the switch transistors are turned on at a high level voltage. The present invention only makes the description taking as an example that the gate line is used as the touch driving electrode line. When the touch driving electrode line provided by the embodiments of the present invention is another functional electrode line, each of the switch transistors is not limited to the N type transistor and can be a P type transistor.

The working principle of touch point positioning and detecting circuit shown in FIG. 1 or 2 will be detailed hereinafter in combination with the time sequence diagram of the optical type sensing touch circuit shown in FIG. 4.

As shown by the time sequence shown in FIG. 4, during the display time of one frame of image, it is mainly divided into three periods, comprising a reset period (time 1), a maintenance period (time 2) and a read period (time 3), which will be respectively described hereinafter.

Figure 4:
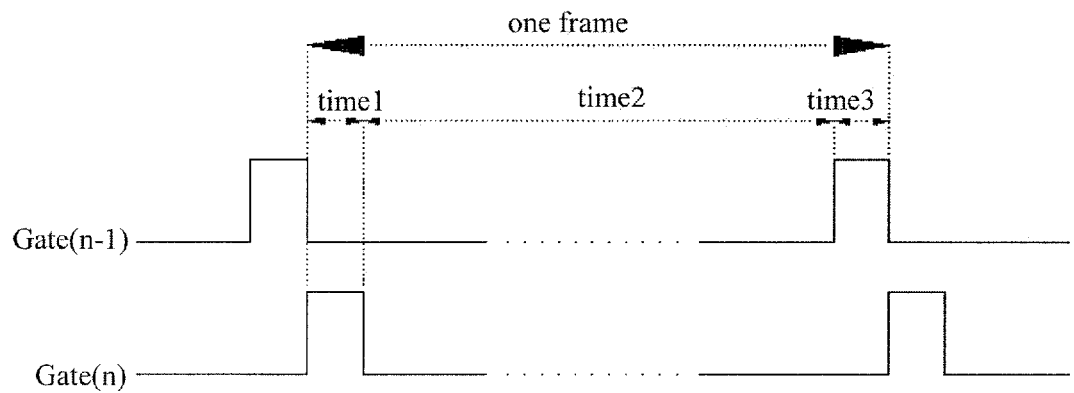
FIG. 4 is a schematic diagram of the time sequence of the touch point positioning and detecting circuit shown in FIG. 1 achieving touch.

The reset period (time 1): referring to FIGS. 1 and 4, during the reset period (time 1), the $n^{th}$ row of gate scan lines (Gate (n)) is in a high level on state, and the $(n-1)^{th}$ row of gate scan lines (Gate (n-1)) is in a low level off state, so that the photo TFT connected with the $n^{th}$ row of gate scan lines is switched on and the switch TFT(T2) connected with the $(n-1)^{th}$ row of gate scan lines is switched off.

Suppose the potential at point A is $V_A$, and the potential at the end of the switch TFT connected with the detecting sub-circuit is $V_A'$. $V_A'$ is the potential at point A read by the touch read signal line.

Figure 5:
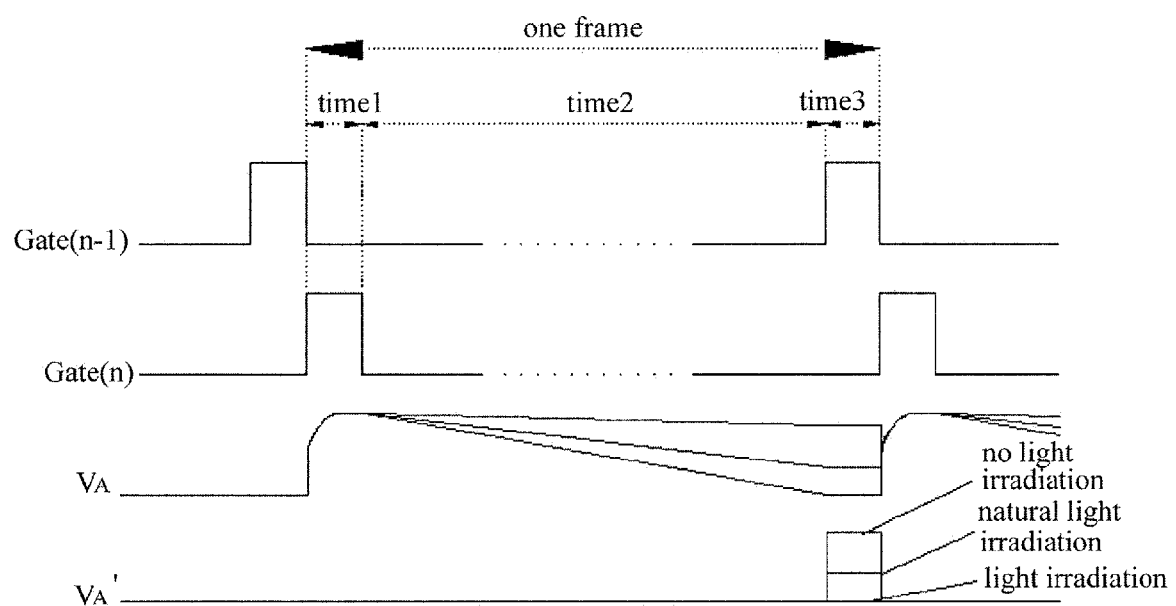
FIG. 5 is a comparison diagram of the output voltages of the second transistor T2 provided by the embodiments of the present invention in a hand touch mode and in an optical pen touch mode when a capacitor Cst is designed properly.

During the reset period, the high level voltage signal of the $n^{th}$ row of gate scan lines is inputted to the end of the capacitor Cst close to the second switch transistor T2, as shown by the point A in FIG. 1, at this moment, the potential at point A is $V_A$. For example, suppose the high level voltage of the $n^{th}$ row of gate scan lines is 5V, when the Gate (n) is at a high level, the voltage at the point A during the reset period is 5V. Referring to FIG. 5, during the reset period (Time 1) the switch TFT(T2) is switched off, and the voltage of the potential $V_A'$ at the point A read by the touch read signal line is zero.

Maintenance period (Time 2): during the maintenance period, the $n^{th}$ row of gate scan lines and the $(n-1)^{th}$ row of gate scan lines are in a low level off state, the switch TFT is still in an off state, and the potential $V_A$ at point A is kept in a high potential state. However, as the photo TFT transistor is in the off state, there exists a drain current, and the potential $V_A$ at point A will gradually decrease as time passes by. Referring to FIG. 5, the voltage of the potential $V_A'$ at the point A read by the touch read signal line is still zero.

It needs to be indicated that the drop degree of the drain current of the photo TFT transistor is related to sensed light, when the light sensed by the photo TFT transistor is weak, the drop degree of the drain current is small; when the light sensed by the photo TFT transistor is strong, the drop degree of the drain current is large. During specific implementation, when the photo TFT transistor is shielded, the drop degree of the drain current of the photo TFT is smaller compared with that in the reset period; when the photo TFT transistor is under natural light, the drop degree of the drain current is larger compared with that in the reset period; when the photo TFT transistor is irradiated by light, the drop degree of the drain current is the largest compared with that in the rest period.

Read period (Time 3): when the $(n-1)^{th}$ row of gate scan lines are in an on state (corresponding to the next frame), the switch TFT (T2) is switched on, so that the photo TFT is switched into conduction with the branch where the TFT (T2) is provided, the potential $V_A$ at the point A during the maintenance period is inputted to the detecting sub-circuit 2 through the touch read signal line, and the detecting sub-circuit 2 conducts data processing and determines the position of the touch point. Referring to FIG. 5, at this moment, the detecting sub-circuit 2 detects the voltage of point A $V_A'$ through the touch read signal line is equal to $V_A$, i.e., $V_A'=V_A$.

The detecting sub-circuit 2 determines whether touch occurs according to the comparison between the voltage $V_A'$ ($V_A'=V_A$) at the point A read during the read period (Time 3) and the pre-stored potential at point A outputted during the read period under natural light.

Specifically, in the case of the natural light, that is, when the touch panel is not touched, the drain current of the photo TFT transistor during the maintenance period is a constant $V_{A\ constant}$. When the touch panel is touched, during the read period, the detecting sub-circuit 2 determines whether touch happens through judging whether the situation occurs that the outputted potential $V_A'$ at the point A sharply increases or decreases with respect to the $V_{A\ constant}$.

The two situations of sharp decrease and sharp increase of the potential $V_A'$ at the point A detected by the detecting sub-circuit 2 with respect to the potential $V_A$ at the point A under the natural light respectively correspond to two modes of touch, that is, a light shielding touch and a light strengthening touch, for example, the touch can be a hand touch mode and an optical pen touch mode.

As shown in FIG. 5, it shows the output voltage $V_A'$ (that is, the voltage at point A detected by the touch read signal line) of the second transistor T2 in the hand touch mode and the optical pen touch mode. The two modes are both based on the principle that the photo TFT is sensitive to light.

In the hand touch mode, finger is used to directly touch, as external light is shielded when the finger touches, the photo TFT does not have light irradiation, the difference between the potential $V_A'$ at point A outputted during the read period and $V_{A\ constant}$ is large, that is, compared with the $V_{A\ constant}$ at the point A outputted under the natural light, when the finger touches the touch panel, the potential $V_A'$ at the point A outputted by the second transistor T2 during the read period increases sharply, and the touch point positioning and detecting circuit can determine that touch occurs at this moment.

In the optical pen touch mode, an optical pen that can emit light is used to achieve touch. As strong light is emitted when the optical pen touches and is irradiated to the photo TFT, and the photo TFT is irradiated by the strong light, the drop degree of the voltage $V_A'$ at point A outputted by the second transistor T2 during the read period is low, $V_A'$ is smaller than $V_{A\ constant}$ and has a large difference with respect to $V_{A\ constant}$, and thus the touch point positioning and detecting circuit can determine that touch occurs at this moment.

As the capacitor storing certain electric charges has some attenuation, the larger the capacitance is, the smaller the attenuation is, or the capacitance almost does not attenuate. The smaller the capacitance is, the larger the attenuation is.

During the specific implementation of the embodiments of the present invention, the capacitor Cst needs to be designed so that, during the read period, the potential change at point A is apparent in the cases of no light irradiation, light irradiation and natural light irradiation, thus the accuracy of the touch can be ensured.

Figure 6:
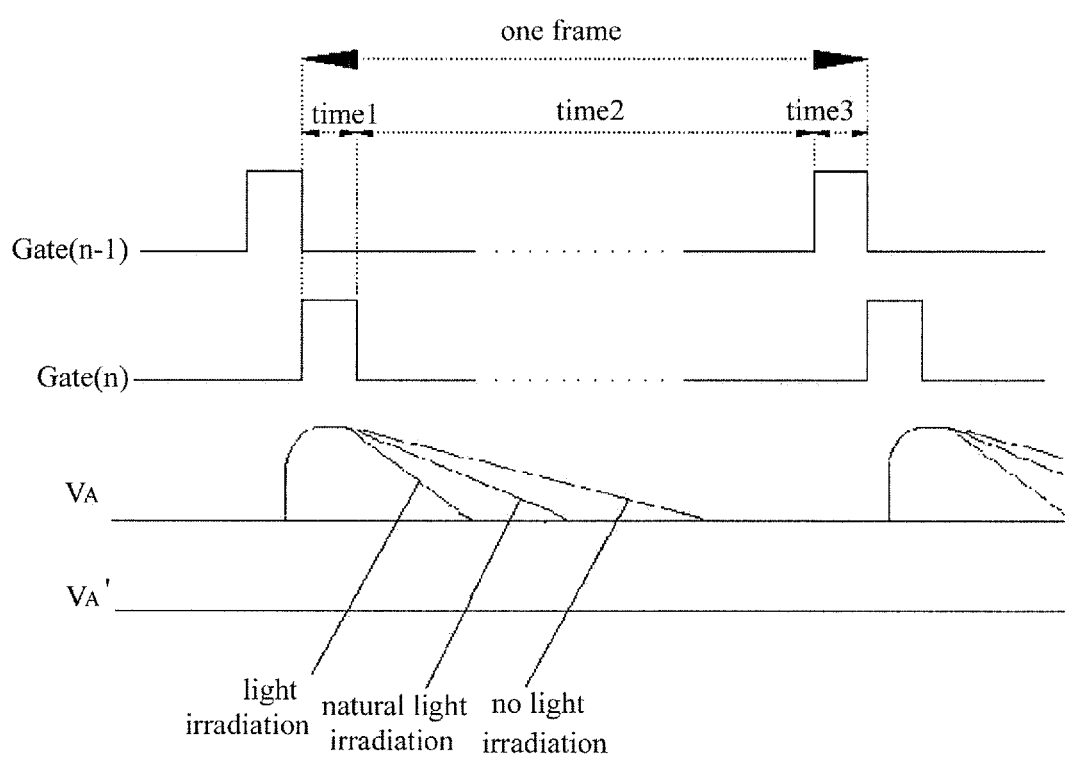
FIG. 6 is a comparison diagram of the output voltages of the second transistor T2 provided by the embodiments of the present invention in the hand touch mode and in the optical pen touch mode when the Cst is designed small.

When the capacitance Cst is so small that, during the read period, the electric charges stored in the capacitor Cst has been attenuated to zero, that is, the potential $V_A$ at point A will quickly attenuate to a very low potential, correspondingly, the voltage $V_A'$ outputted by the second transistor T2 corresponding to the point A is also small, as shown in FIG. 6, the detecting sub-circuit could hardly differentiate the potential $V_A'$ corresponding to the point A during the read period in the cases of no light irradiation, light irradiation and natural light irradiation. That is, in the above three situations, the potential difference at point A is small, and it is difficult to determine whether touch occurs.

When the capacitance Cst is proper, as shown in FIG. 5, during the read period, the potential difference at point A in the cases of no light irradiation, light irradiation and natural light irradiation is apparent.

When the capacitance Cst is too large, the opening rate of the pixels will be affected. Therefore, when the Cst is designed, various factors should be considered to determine a proper capacitance.

The optical switch transistor (the first switch transistor) provided by the embodiments of the present invention can be formed of, but not limited to, a-Si which is sensitive to light.

The embodiments of the present invention also provide an in-cell touch panel comprising the above touch point positioning and detecting circuit.

The touch drive electrode of the in-cell touch panel is a gate line, and the touch sensing electrode can be provided on the substrate where the gate line is located or on the substrate opposite to the substrate where the gate line is located.

The touch point positioning and detecting circuit of the in-cell touch panel is provided within sub-pixel units (that is, a light transmission area of the display panel), and can feel the light change more sensitively when the touch panel is touched. That is, the perpendicular projection of the touch point positioning and detecting circuit on the substrate does not overlap the projection of the black matrix, which is located on the color filter substrate, on the substrate.

Figure 7:
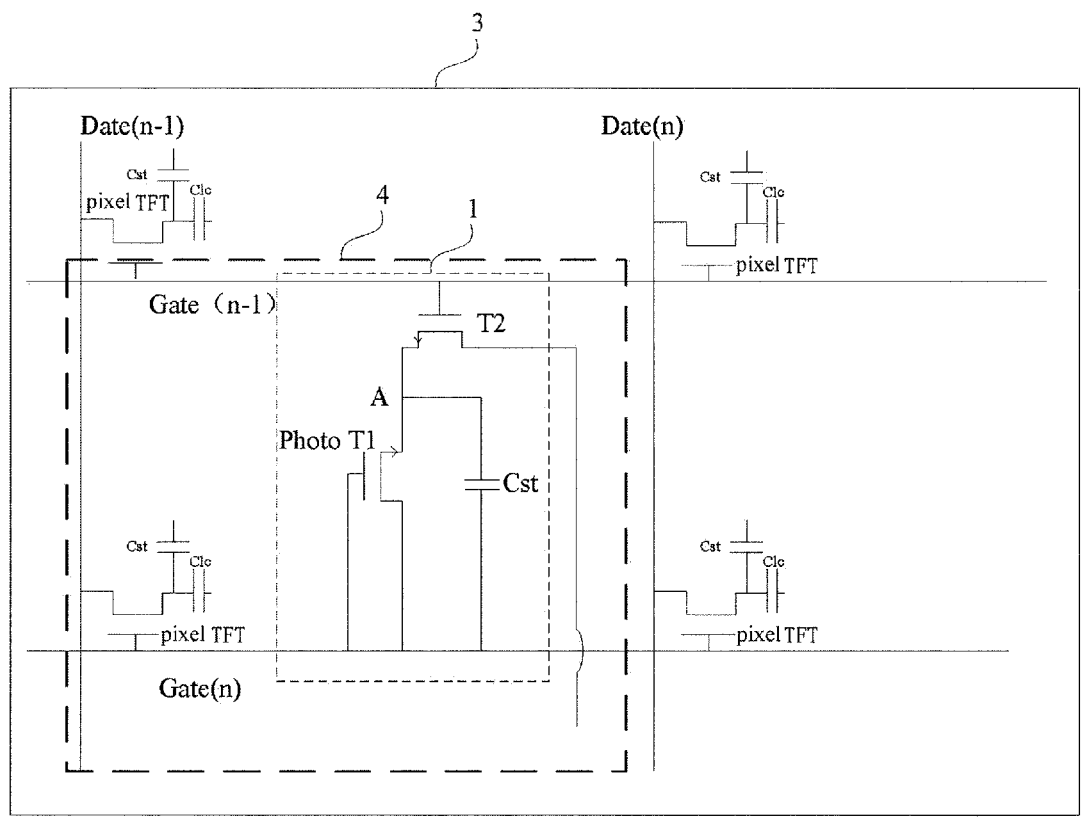
FIG. 7 is a schematic diagram of part of the structure of the touch panel comprising the touch point positioning and detecting circuit shown in FIG. 1 provided by the embodiments of the present invention.

FIG. 7 shows one substrate of the in-cell touch panel, and the substrate is the lower substrate of the display panel (for example, an LCD panel or OLED panel). That is, the circuit in the in-cell touch panel and the array type pixels on the lower substrate of the display panel are integrated together.

Referring to FIG. 7, it comprises a substrate 3 and a plurality of sub-pixel units 4 located on the substrate 3 and distributed in a matrix, and the sub-pixel units 4 comprise a pixel TFT and capacitors Cst and Clc for achieving image display.

The sub-pixel units 4 further comprise the touch sensing sub-unit 1 in the touch point positioning and detecting circuit provided by the embodiments of the present invention.

Each sub-pixel unit can be provided with a touch sensing sub-unit 1 of the touch point positioning and detecting circuit provided by the embodiments of the present invention, and a plurality of the touch sensing sub-units 1 can be provided among a plurality of non-adjacent rows of sub-pixel units, which periodically separate the plurality of the sub-pixel units.

The embodiments of the present invention further provide a display device comprising a plurality of the above touch panels provided by the embodiments of the present invention, and the display device can be a liquid crystal panel, a liquid crystal display, an OLED panel, an OLED display and etc., which have a touch function.

In Summary, the embodiments of the present invention provide a touch point positioning and detecting circuit for a touch panel, an in-cell touch panel and a display device. The touch point positioning and detecting circuit is constituted by two switch transistors and one capacitor. The first switch transistor is an optical type switch transistor. The second switch transistor controls the output of the touch signal. The first switch transistor is sensitive to light intensity and achieves an optical sensing type touch function. The optical sensing type touch panel is not limited by the size of the display panel and has a stable service life.

The embodiments of the invention are thus described, and it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A touch point positioning and detecting circuit for a touch panel, comprising: a touch sensing sub-circuit, a detecting sub-circuit which is connected with the touch sensing sub-circuit and is configured to determine the position of a touch point according to a touch signal outputted by the touch sensing sub-circuit, and a first touch driving electrode line and a second touch driving electrode line;

the touch sensing sub-circuit comprises; a capacitor, a first switch transistor and a second switch transistor; a gate and a source of the first switch transistor being connected with the first touch driving electrode line, and a drain of the first switch transistor being connected with a drain of the second switch transistor; a source of the second switch transistor being connected with the detecting sub-circuit, and a gate of the second switch transistor being connected with the second touch driving electrode line; one end of the capacitor being connected with the drain of the first switch transistor and the other end of the capacitor being connected with an electrode line providing a high level voltage;

wherein, the first switch transistor is an optical switch transistor, and wherein, the first touch driving electrode line and the second touch driving electrode line are gate lines.

2. The circuit according to claim 1, wherein, the electrode line providing the high level voltage is the first touch driving electrode line.

3. The circuit according to claim 2, wherein, the first touch driving electrode line and the second touch driving electrode line are gate lines.

4. The circuit according to claim 2, wherein, the first switch transistor and the second switch transistor are N type transistors.

5. The circuit according to claim 2, wherein, the detecting sub-circuit comprises:

an amplifier, a capacitor connected across the reverse input end and the output end of the amplifier, and a switch connected across the reverse input end and the output end of the amplifier, and the source of the second switch transistor is connected with the reverse input end of the amplifier.

6. The circuit according to claim 1, wherein, the electrode line providing the high level voltage is a common electrode line.

7. The circuit according to claim 6, wherein, the first touch driving electrode line and the second touch driving electrode line are gate lines.

8. The circuit according to claim 6, wherein, the first switch transistor and the second switch transistor are N type transistors.

9. The circuit according to claim 6, wherein, the detecting sub-circuit comprises:

an amplifier, a capacitor connected across the reverse input end and the output end of the amplifier, and a switch connected across the reverse input end and the output end of the amplifier, and the source of the second switch transistor is connected with the reverse input end of the amplifier.

10. The circuit according to claim 1, wherein, the first switch transistor and the second switch transistor are N type transistors.

11. The circuit according to claim 10, wherein, the detecting sub-circuit comprises:

an amplifier, a capacitor connected across the reverse input end and the output end of the amplifier, and a switch connected across the reverse input end and the output end of the amplifier, and the source of the second switch transistor is connected with the reverse input end of the amplifier.

12. The circuit according to claim 1, wherein, the first switch transistor and the second switch transistor are N type transistors.

13. The circuit according to claim 1, wherein, the detecting sub-circuit comprises:
an amplifier, a capacitor connected across the reverse input end and the output end of the amplifier,and a switch connected across the reverse input end and the output end of the amplifier, and the source of the second switch transistor is connected with the reverse input end of the amplifier.

14. The circuit according to claim 1, wherein, the detecting sub-circuit comprises:
an amplifier, a capacitor connected across the reverse input end and the output end of the amplifier, and a switch connected across the reverse input end and the output end of the amplifier, and the source of the second switch transistor is connected with the reverse input end of the amplifier.

15. A touch pan& comprising the touch point positioning and detecting circuit according to any of claim 1.

16. The touch panel according to claim 15, wherein, the detecting circuit is located in a display area of the sub-pixel units of an array substrate.

17. A display device comprising the touch panel according to claim 15.

\* \* \* \* \*